United States Patent
Marciante et al.

(10) Patent No.: US 10,164,398 B2
(45) Date of Patent: Dec. 25, 2018

(54) EFFICIENT LASING WITH EXCITED-STATE ABSORPTION-IMPAIRED MATERIALS

(71) Applicant: University of Rochester, Rochester, NY (US)

(72) Inventors: John R. Marciante, Rochester, NY (US); Haomin Yao, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

(21) Appl. No.: 15/513,228

(22) PCT Filed: Sep. 22, 2015

(86) PCT No.: PCT/US2015/051423
§ 371 (c)(1),
(2) Date: Mar. 22, 2017

(87) PCT Pub. No.: WO2016/049011
PCT Pub. Date: Mar. 31, 2016

(65) Prior Publication Data
US 2017/0264068 A1 Sep. 14, 2017

Related U.S. Application Data

(60) Provisional application No. 62/053,491, filed on Sep. 22, 2014.

(51) Int. Cl.
*H01S 3/30* (2006.01)
*H01S 3/067* (2006.01)
*H01S 3/094* (2006.01)
*H01S 3/16* (2006.01)

(52) U.S. Cl.
CPC .......... *H01S 3/06754* (2013.01); *H01S 3/067* (2013.01); *H01S 3/0675* (2013.01); *H01S 3/06733* (2013.01); *H01S 3/06783* (2013.01); *H01S 3/094003* (2013.01); *H01S 3/1605* (2013.01); *H01S 3/1618* (2013.01); *H01S 3/16* (2013.01); *H01S 2301/03* (2013.01)

(58) Field of Classification Search
CPC .............. H01S 3/06733; H01S 3/0675; H01S 3/094003; H01S 3/1605; H01S 3/1618; H01S 3/067; H01S 3/16; H01S 3/06783; H01S 3/06754
See application file for complete search history.

(56) References Cited

U.S. PATENT DOCUMENTS

| | | | |
|---|---|---|---|
| 4,403,323 A | 9/1983 | Nicolai | |
| 4,811,349 A * | 3/1989 | Payne | C30B 13/00 372/39 |
| 5,136,005 A * | 8/1992 | Hermes | C08F 220/14 526/292.3 |
| 5,182,759 A * | 1/1993 | Anthon | H01S 3/07 372/107 |

(Continued)

*Primary Examiner* — Kinam Park
(74) *Attorney, Agent, or Firm* — Hodgson Russ LLP

(57) ABSTRACT

Laser signal intensity is resonantly enhanced within a laser cavity to be greater than a pump intensity. This enables the suppression of excited-state absorption and is applicable to terbium-doped fiber lasers, lambda-type materials, or other materials used in lasers. In other embodiments, ESA is suppressed by de-populating the higher excited state using a resonant cavity.

20 Claims, 6 Drawing Sheets

(56) References Cited

U.S. PATENT DOCUMENTS

| | | | | |
|---|---|---|---|---|
| 5,369,523 A | * | 11/1994 | Millar | H01S 3/094003 |
| | | | | 359/341.32 |
| 5,394,413 A | | 2/1995 | Zayhowski | |
| 5,530,711 A | * | 6/1996 | Scheps | H01S 3/094034 |
| | | | | 372/20 |
| 5,848,204 A | | 12/1998 | Wanser | |
| 6,288,835 B1 | * | 9/2001 | Nilsson | H01S 3/06729 |
| | | | | 359/341.3 |
| 6,510,276 B1 | * | 1/2003 | Jain | H01S 3/06716 |
| | | | | 359/341.1 |
| 7,218,662 B1 | | 5/2007 | Ilchenko et al. | |
| 7,633,621 B2 | | 12/2009 | Thornton | |
| 2003/0030892 A1 | * | 2/2003 | Dennis | C03C 3/06 |
| | | | | 359/341.1 |
| 2007/0290147 A1 | * | 12/2007 | Parilov | G01N 21/6408 |
| | | | | 250/492.1 |
| 2008/0086038 A1 | * | 4/2008 | Thornton | A61B 5/14532 |
| | | | | 600/310 |
| 2012/0033688 A1 | * | 2/2012 | Liaw | H01S 3/08036 |
| | | | | 372/20 |

* cited by examiner

4-Level

3-Level

4-Level + ESA

3-Level + ESA

Inverted 3-Level + ESA

4-Level + ESA

3-Level + ESA

Inverted 3-Level + ESA

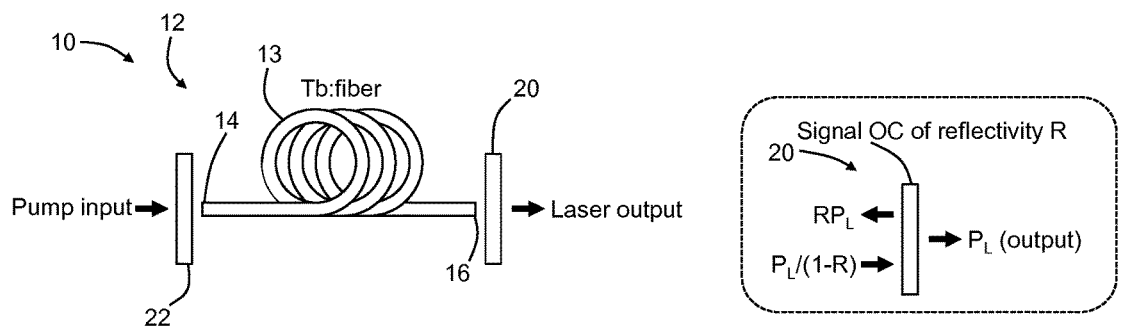
Fig. 14
Fig. 15
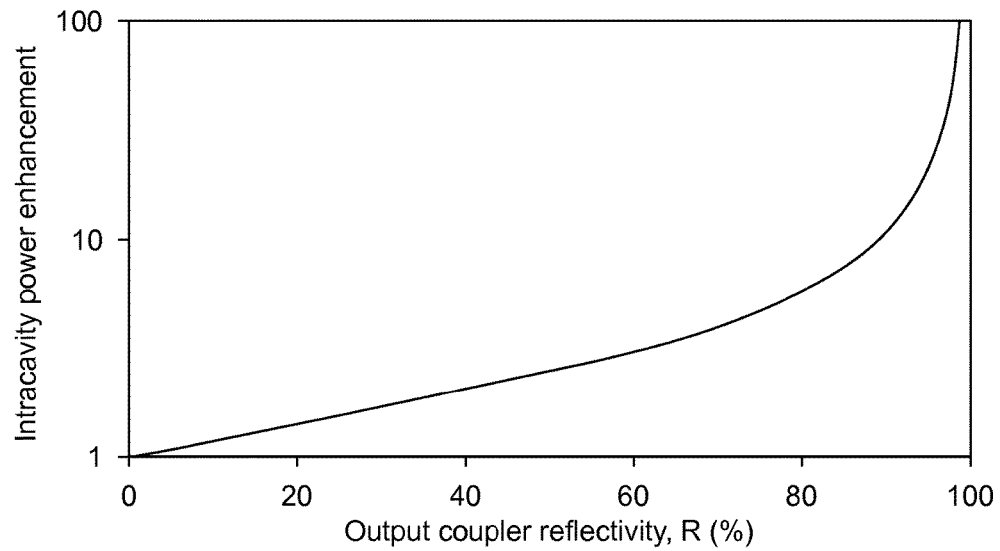
Fig. 16
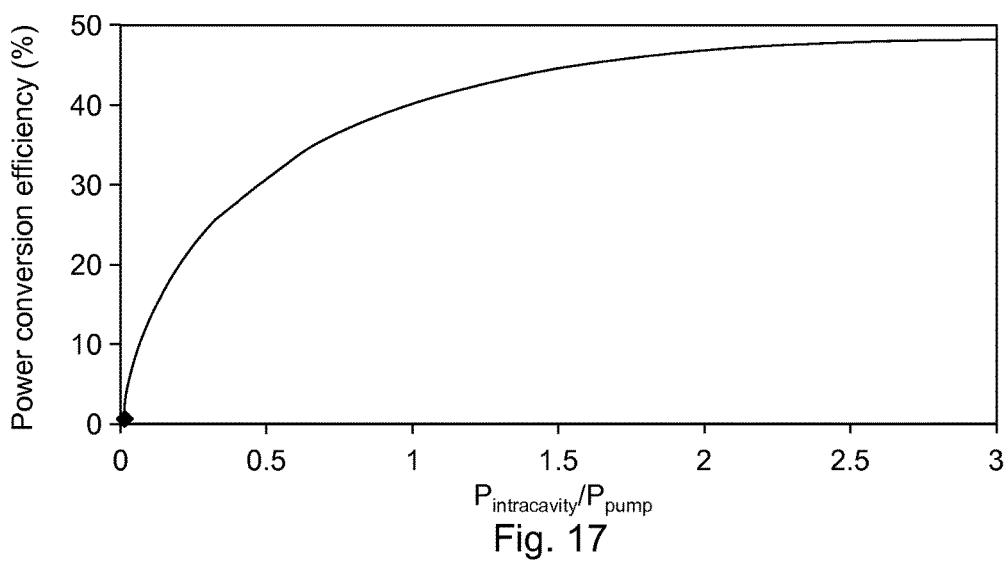
Fig. 17

EFFICIENT LASING WITH EXCITED-STATE ABSORPTION-IMPAIRED MATERIALS

CROSS-REFERENCE TO RELATED APPLICATIONS

This application claims priority to U.S. Provisional Application No. 62/053,491, filed on Sep. 22, 2014, the disclosure of which is incorporated herein by reference.

FIELD OF THE DISCLOSURE

The disclosure relates to laser systems and, more particularly, to laser with non-traditional materials.

BACKGROUND OF THE DISCLOSURE

Visible lasers are becoming increasingly important for many application areas. In healthcare and medical research, visible lasers are used for oncologic photodynamic therapy, glucose level monitoring, prostate ablation, gene mapping and chromosome sorting, and other medical treatments and biomedical diagnostics. In environmental monitoring and protection, visible lasers are used for bathymetric (oceanic) sensing and monitoring, large-scale algae mapping, geological activity monitoring, undersea optical data transmission, and artificial guide stars for trans-atmospheric imaging. High-tech commercial applications may need visible lasers for three-dimensional displays, high-density optical storage, or high-speed, high-resolution printing.

Many of these applications require high powers, ranging from 100 mW for medical diagnostics and data storage to 10's of Watts for artificial guide stars and laser displays. Unfortunately, gaining access to reliable visible laser wavelengths at high power has proven difficult, even though many materials appear suitable for producing visible lasers. Common paths to visible lasers include gas and liquid lasers, semiconductor and exotic glass lasers, and nonlinear conversion methods.

Gas lasers, dye lasers, and optical parametric oscillators (OPOs) are cumbersome, inefficient, and require continual alignment, making them poor candidates for any application outside the laboratory environment. Second harmonic generation (SHG) and other specialty crystals can only reach limited visible wavelength bands, while upconversion techniques are inefficient.

Semiconductors are a laser material system that can cover the entire visible band. Recent advances in GaN semiconductor lasers have allowed direct access to visible wavelengths, ranging from red to blue and into the UV. Like most semiconductor lasers, however, obtaining powers substantially beyond 10 mW becomes increasing difficult due to thermal stress, facet damage, and beam break-up due to filamentation, making them unsuitable for many high-power (>100 mW) applications.

Most high-power visible lasers are frequency-doubled solid-state or semiconductor lasers. The prime example seen in green laser pointers is Nd:YAG doubled to 532 nm. Frequency doubled lasers are inefficient, as well as limited in wavelength. Upconversion lasers are similarly inefficient. Fiber lasers based on non-silica glasses are typically difficult to fabricate and fragile to handle.

Fiber and other solid-state lasers offer practical benefits in terms of reliability and efficiency. Fiber lasers in particular offer compact packaging, extremely robust all-fiber (alignment free) cavities, and heat dissipation well beyond the 100 W level. Moreover, advances in telecommunications and high-power infrared (IR) fiber lasers have pushed the silica fiber platform to unprecedented heights of technological infrastructure, including pump packaging, all-fiber components, and custom fiber fabrication with specifications nearly identical to high-end commercial fabrication. These advantages make fiber lasers the ideal general laser platform.

Recent work in direct (i.e., not upconversion) visible fiber lasers has utilized rare earth dopants of Pr, Dy, Sm, and Tb. As will be described later, most of these efforts required the use of fibers in exotic materials such as fluoride-based ZBLAN, which is brittle, difficult to fabricate, difficult to handle and process, and in general not suitable for the common highly developed fiber optical platform (silica). In other words, such a specialty fiber, by not being compatible with the silica platform, no longer carries the significant advantages commonly touted for "fiber lasers."

Rare earth (RE) dopants are highly soluble in glass and therefore suitable for fiber lasers. Most RE ions have one or more atomic transitions that produce visible emission. However, there are many issues prohibiting the use of many of these elements. The most prominent in determining which material system and RE ion to use is the issue of multiphonon emission. Although a given energy level may in general have a large lifetime suitable for high efficiency lasing characteristics, this lifetime can be significantly reduced depending on the host (glass matrix) that it is doped into. The excited electron can interact with the multiple phonons of the host medium to extract sufficient energy to reduce the electron down to the next available energy level. Since the transition probability for such an interaction decreases exponentially with the number of phonons required for the interaction, it is desirable to use a RE ion with an upper (meta-stable) fluorescing level that is high above the next lower energy level. From this perspective, it would seem that terbium is a good candidate for a lasing RE ion, since the $^5D_4$ level is 14 cm$^{-1}$ above the next lower level. This energy level spacing is larger than all other RE ions with visible optical transitions, and more than twice the energy separation than all other RE ions except europium.

The energy separation is not the only factor in determining the strength of multi-phonon interactions. The material composition of the host medium that supplies the phonons is critical. Since the meta-stable fluorescence rate is on the order of a few milliseconds for most RE ions, having a host medium with a similar or shorter multi-phonon emission rate serves to reduce the upper-state lifetime drastically. For the same energy gap, ZBLAN (fluoride fiber) has a multi-phonon emission rate that is 1,000× lower than that of silica fiber. For this reason, ZBLAN has been a material chosen for visible fiber lasers despite the inability for ZBLAN to mesh with the highly developed silica infrastructure.

However, the benefits of lower multi-phonon emission of ZBLAN may be regained by using terbium as the RE ion. Experiments in visible emission used praseodymium, dysprosium, and samarium as the RE ions. The energy gap from the nearest lower energy level is on the order of 7,000-8,000 cm$^{-1}$ for each of these ions. In terbium, the energy gap is twice as large (~15,000 cm$^{-1}$). Given the extreme slopes of the multi-phonon emission curves, the multi-phonon emission rate can be lowered by well over a factor of 1,000 by using terbium, potentially allowing the silica platform to be exploited.

Terbium RE ions have additional benefits over other RE ions with visible transitions. First, Tb$^{3+}$ has emission lines that span a significant range of visible light with regards to visual color discrimination. FIG. 1 shows the photoluminescence emission spectra of highly Tb$^{3+}$ doped (56-wt %)

fiber excited with UV (405 nm) light. FIG. 1 demonstrates that nearly the entire color perceptive scale (except violet) can be achieved using a single gain medium. This has tremendous implications for high-power, energy-conserving laser displays.

FIG. 1 also clearly demonstrates the potential for low-cost, high-power Tb:fiber lasers for use in bathymetry (480-550 nm), artificial guide stars (589 nm), oncologic photo-dynamic therapy (620-630 nm), and the other applications previously listed. Moreover, there are more accessible visible emission bands in Tb than in Pr or Dy. This makes Tb highly attractive as a platform for research and development as it can cover a much wider range of the visible spectrum than any other RE element.

An additional benefit from terbium comes from its absorption characteristics. FIG. 2 shows the absolute absorption spectrum of our highly $Tb^{3+}$ doped (56-wt %) fiber. The measurement was performed using an arc lamp as a source, with the absorption spectrum calculated by dividing the output spectrum by the input spectrum. The resulting absorption, displayed in FIG. 2 in units of dB/m, has several distinguishing features. First, by using a multi-component silicate glass host, the absorption coefficient can be very large, well suited to the dual-clad fiber laser geometries that have led to kW-class fiber laser systems by allowing the use of inexpensive diode laser pumps. Second, there is a strong absorption peak at ~488 nm, allowing for the possibility of pumping with frequency-doubled 976-nm pump lasers (commercially at the Watt level) or possibly upconversion cooperative energy transfer (CET) by co-doping the Tb:fiber with ytterbium that has a very strong 976-nm absorption peak. There is a strong and broad absorption peak centered around 400 nm. Violet diode lasers at 405 nm are currently undergoing significant development due to the Blu-ray DVD market, with commercially available individual lasers approaching the Watt level. As such, direct violet diode pumping of Tb:fiber lasers will ultimately enable high-efficiency generation of laser light at all perceptual visible wavelengths.

A factor that determines the quality of a specific laser material is the presence of excited-state absorption (ESA), wherein a pump photon gets absorbed, exciting an electron from the meta-stable state to an even higher energy state that cannot provide optical emission. This highly excited electron loses energy to multi-phonon or cascaded phonon interactions, sometimes even bypassing the meta-stable level entirely. In either case, the net result is loss for pump or signal (depending on which energy levels exhibit ESA properties), resulting in severely degraded laser efficiency. FIG. 3 shows a diagram of the relevant levels for visible lasing in terbium. Once an electron has been excited to the $^5D_4$ level, the location of the $^4f_75d$ band allows this electron to be excited to yet a higher level. This additional imparted energy is lost to the host material via multi-phonon interaction, causing a net reduction in the meta-stable level population and an effective reduction in absorbed pump power.

Given the small-signal nature of the gain measurement, a linear trend is expected for gain as a function of increasing pump power. However, the practical implications of ESA result in the measured gain rapidly rolling over with increasing pump power, regardless of pumping architecture. The modeling indicates that this is due to ESA, as described above.

For this reason, ESA is a major impediment towards realizing visible fiber lasers using terbium. Avoiding ESA is one of the primary reasons that others have used praseodymium, dysprosium, and samarium instead of terbium to generate visible light from fibers. However, these materials nominally require ZBLAN fibers to minimize multi-phonon interactions, and as indicated above, working in a non-silica host is a major impediment in achieving robust and reliable fiber laser technology.

Therefore, what is needed is a new method of lasing with ESA-impaired laser materials and, more particularly, to mitigate ESA effects to allow the use of terbium, lambda-type materials, or other materials in a laser.

BRIEF SUMMARY OF THE DISCLOSURE

Embodiments for overcoming ESA for Tb:fiber, lambda-type materials, or other materials in high-power visible fiber lasers are disclosed. Tb-doped multi-component silicate, phosphate, and some other fibers may be integrated with the conventional silica platform.

Mitigating ESA effects may allow the use of terbium as an RE dopant for visible fiber laser emission. Use of terbium will provide benefits including: (a) use of the commercial (non-exotic) silica fiber platform; (b) coverage of all perceptual visible colors, with more visible emission bands than any other RE ion; and (c) direct diode pumping with commercial violet diode lasers.

DESCRIPTION OF THE DRAWINGS

For a fuller understanding of the nature and objects of the disclosure, reference should be made to the following detailed description taken in conjunction with the accompanying drawings, in which:

FIG. 14 illustrates a simplified Tb:fiber laser resonator schematic according to an embodiment of the present disclosure;

FIG. 15 illustrates incident, transmitted, and reflected signal powers at the output coupler (OC) of the resonator of FIG. 14;

FIG. 16 compares intracavity power enhancement [R+1/(1−R)] as a function of output coupler reflectivity R;

FIG. 17 compares pump-to-signal power conversion efficiency as a function of intra-cavity signal power (represented by the signal seed power) normalized to the launched pump power and wherein the data point is an experimental measurement;

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the spirit or scope of the disclosure. It should be noted that the terms "laser material" and "gain medium" are used interchangeably herein.

Figure 8:
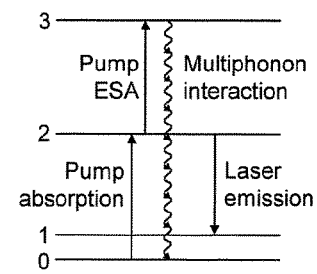
FIG. 8 illustrates simplified energy-level diagrams for invert 3-level (lambda) laser materials wherein solid lines indicate optical interactions and wavy lines indicate phonon interactions.

By using the presently disclosed techniques, the excited pump state can have an arbitrarily long lifetime, which enables a significant number of new lasing materials that were previously rejected. In fact, it also leads to an entirely unique new class of laser materials, inverted 3-level materials (also called "lambda" materials for their pictorial similarity to the capital Greek letter Λ). Embodiments disclosed herein can enable lasing in lambda-type three-level laser systems, as well as, conventional 3- and 4-level systems having excited pump states susceptible to excited-state absorption (ESA). The problem with lasing in such systems is ESA. The simplified energy levels of a lambda-material system is shown in FIG. 8. In such a laser material, the pump absorption and the signal emission share a common upper state (state 2 in FIG. 8). For efficient lasing, a long lifetime is required of the electron populating this upper state. However, electrons in this state can absorb yet another pump photon (becoming excited to state 3), then lose the energy via multiphonon interactions back to state 2 or even state 1. Because of this, lambda-type systems cannot readily be used for lasing.

Figure 5:
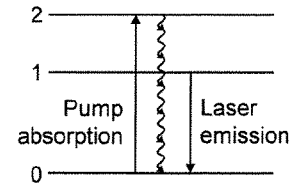
FIG. 5 illustrates a simplified energy-level diagram for a conventional three-level laser system wherein solid lines indicated optical interactions and wavy lines indicated phonon interactions.

This behavior is in contrast to conventional three-level systems in which the pump absorption and signal emission commonly share the lower (ground) state, as shown in FIG. 5. In this case, level 2 can have a small lifetime, allowing most of its population to relax down to the desirable metastable (long-lifetime) upper lasing state (state 1), thereby eliminating any seriously detrimental ESA.

The presently disclosed techniques are derived from depopulating the upper lasing state. In other words, if there is little population in the upper state, then ESA cannot be problematic. This population cannot be arbitrarily minimized as population is required in the upper state in order to obtain optical gain. The present disclosure advantageously depopulates the upper state by extracting all optical gain. In this way, ESA is reduced and output power efficiency is increased.

Terbium (Tb) is a lambda-type laser system with visible emission in the blue, green, yellow, orange, and red, making it a candidate for development, particularly using embodiments disclosed herein. As discussed above, ESA impedes the ability to achieve high-power from Tb:fibers. In one embodiment of the present disclosure, this hurdle is removed by using resonant laser cavity enhancement. To illustrate the problem and the present solution, the rate equations for terbium RE ions is examined. Considering the level diagram shown in FIG. 3, the upper (meta-stable) laser level population $N_2$ is governed by Equation 1:

$$\frac{dN_2}{dt} = \left(\frac{\sigma_p^a I_p}{h\nu_p}N_0 - \frac{\sigma_p^e I_p}{h\nu_p}N_2\right) - \frac{\sigma_p^{ESA} I_p}{h\nu_p}N_2 - \frac{\sigma_s^e I_s}{h\nu_s}N_2 + \left(\frac{N_3}{\tau_{3,2}} - \frac{N_2}{\tau_2}\right) \quad (1)$$

where $N_i$ are the level populations, $I_i$ is the optical intensity of the pump (p) or signal (s), $\nu_i$ is the optical frequency of the pump (p) or signal (s), $\tau_{3,2}$ is the non-radiative (multiphonon) decay from level 3 to level 2, and $\tau_2$ is the total non-radiative (multiphonon) decay from level 2. The $\tau$ terms are the cross sections (transition probabilities) for absorption (a), stimulated emission (e) and excited-state absorption (ESA) for the pump (p) or signal (s). The first two terms on the right-hand side of Equation 1 represent absorption and stimulated emission, respectively. The third term represents ESA, while the fourth term represents stimulated emission. The final two terms are due to multiphonon interactions, population decaying from level 3 to level 2, and population decaying out of level 2, respectively.

Figure 12:
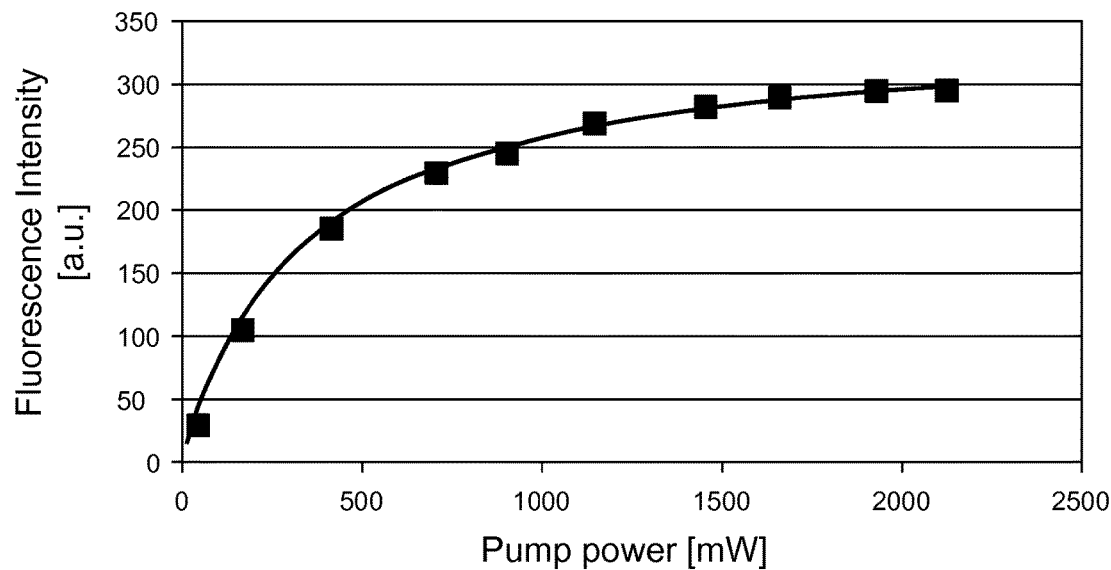
FIG. 12 plots measured and calculated fluorescence as a function of excitation power of a reference system and the curve is modeling results using the pump ESA cross-section as a fitting parameter.
Figure 13:
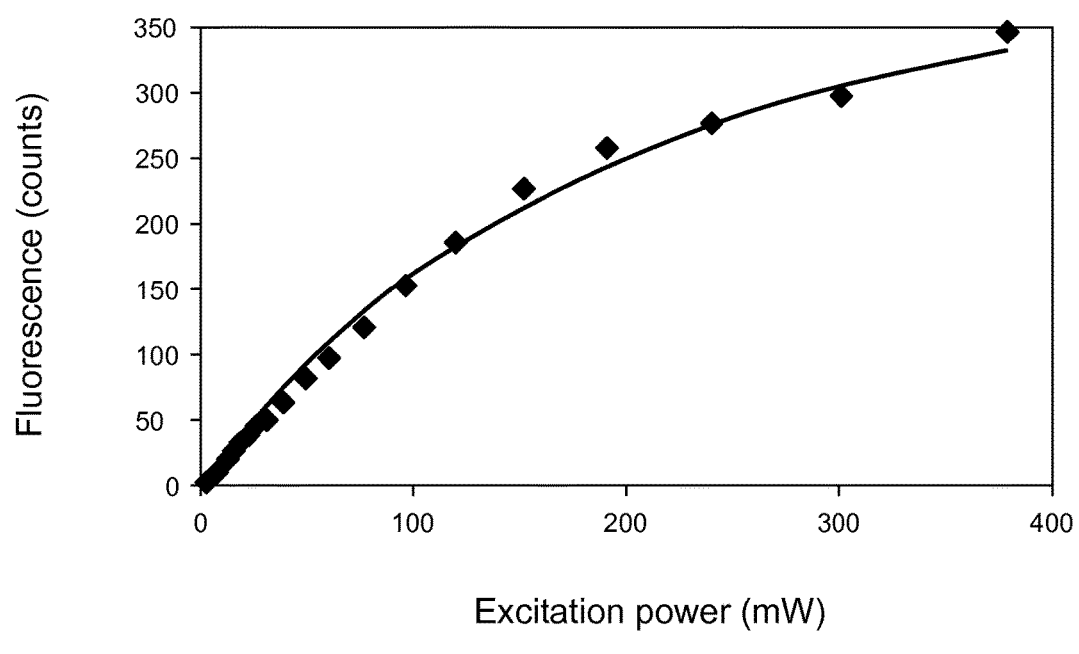
FIG. 13 plots measured and calculated fluorescence as a function of excitation power in a system with 56 wt % Tb:silicate fiber and wherein the points are data and the curve is modeling results using the pump ESA cross-section as a fitting parameter.

The pump ESA cross section ($\sigma_p^{ESA}$) determines the strength of the detrimental interaction. The value of this cross section can be been inferred by fitting rate equation models to experimental measurements using the pump ESA cross section as the fitting parameter. In the first Tb:fiber laser demonstration, the model was fit to the gain measured as a function of pump power. The model can also be fit to a measurement of the fluorescence signal as a function of excitation power, as shown in FIGS. 12-13. FIG. 12 shows results from others [M. Mühlheim, W. Lüthy, and T. Feurer, "On the possibility of excited-state-absorption from $^5D_4$ in $Tb^{3+}:Al^{3+}:SiO_2$." IAP Report 2007-04-ZD, Institut für angewandte Physik, Universität Bern, Bern, Switzerland, 2007], while FIG. 13 shows results generated using a 56 wt % Tb:silicate fiber. In each case, the rate equation model is used to fit the data using the pump ESA cross section as a fitting parameter.

The results of these numerical determinations of the ESA cross section are tabulated in Table I below, which shows that there is a wide range of inferred ESA values depending on the fiber used in the measurement. However, by also including the terbium doping level of each fiber, it can be readily seen that higher doping levels leads to a higher pump ESA cross section. However, regardless of the doping level, the minimum ESA cross section is almost 5 times larger than the pump absorption cross section to the excited level ($\sigma_p^a$). In the simplest picture, this implies that ions excited to the upper lasing state have little chance to provide the desired optical gain. The data in Table I also implies that eliminating ESA by reducing the Tb doping level is simply not viable while still providing optical gain.

TABLE I numerically fit pump ESA cross sections and Tb doping level in the fiber

|  | Previous Work | Previous Work | Current Disclosure |
| --- | --- | --- | --- |
| $\sigma_p^{ESA}$ | $9.26 \times 10^{-22}$ cm² | $11.4 \times 10^{-22}$ cm² | $28.5 \times 10^{-22}$ cm² |
| Tb doping level | 1 wt % | 3 wt % | 56 wt % |

Equation 1 shows the relative strengths of the various mechanisms that bring electrons into or out of the upper lasing state. Comparing the first and third terms demonstrates the persistent nature of ESA. The ratio of these two terms is shown in Equation 2:

$$\frac{\text{Pump ESA}}{\text{Pump Absorption}} = \frac{\sigma_p^{ESA} I_p}{h\nu_p} N_2 \bigg/ \frac{\sigma_p^a I_p}{h\nu_p} N_0 = \frac{\sigma_p^{ESA} N_2}{\sigma_p^a N_0} \quad (2)$$

Since the ground state may not participate in the lasing process (terbium behaves as a quasi-four-level system in the classic sense), $N_0$ will always be large allowing significant pump absorption. This leads directly to population in the upper state ($N_2$). Reducing the doping density may not help since the fractional populations ($N_0/N_T$ and $N_2/N_T$) will remain the same and not change the ratio. Therefore, one way to reduce the impact of ESA is to minimize the population of the upper state, which is seemingly in direct violation of providing optical gain.

However, minimizing $N_2$ and therefore ESA by extracting the optical gain may be performed. Consider another ratio of terms from Equation 1, the ratio of the fourth to third terms. Taking the ratio of stimulated emission to ESA shown in Equation 3 allows us to understand the primary competing mechanisms for the upper-state population and shows the desirable impact of high laser signal ($I_s$) compared to the pump power ($I_p$):

$$\frac{\text{Signal Emmission}}{\text{Pump ESA}} = \frac{\sigma_s^e I_s}{h\nu_s} N_2 \bigg/ \frac{\sigma_p^{ESA} I_p}{h\nu_p} N_2 = \frac{\sigma_s^e \nu_p}{\sigma_p^{ESA} \nu_s} \left(\frac{I_s}{I_p}\right) \quad (3)$$

Although the ratio of cross sections and frequencies is essentially fixed, the ratio of the signal and pump intensities can be almost arbitrarily chosen by properly designing the laser resonator cavity (also referred to herein as the optical cavity). Consider the simplified laser 10 configuration shown in FIG. 14. An optical cavity 12 is formed by an optical fiber 13, and reflectors at a back (input) end 14 of the cavity and the front (output) end 16 of the cavity 12. The input end 14 of the cavity 12 provides ~100% reflection for the laser signal while transmitting the pump light into the Tb:fiber. For example, the laser 10 may comprise an input element 22 the input end of the cavity 12. The front (output) end 16 of the cavity 12 has an output coupler 20 that is partially reflecting in order to provide feedback to the resonator 12 and allow usable power to emit from the cavity 12.

The output power of the laser is determined by thermodynamic argument (conservation of energy). In other words, if the pump power is 1 W, the output power must be less than 1 W, the precise level being determined by the efficiency of the laser system. However, the intra-cavity power, that is the re-circulating power stored in the resonator via the end mirrors, can be much larger than the pump power, which only courses a single transit across the cavity length. For the resonator configuration shown in FIG. 14, the enhancement of the intra-cavity power is determined solely by the reflectivity (R) of the output coupler 20. The incident, transmitted, and reflected signal powers at the output coupler 20, shown in FIG. 15, yield an intra-cavity power that is enhanced by a factor of [R+1/(1−R)]. This intra-cavity power enhancement factor, plotted in FIG. 16 as a function of output coupler reflectivity R, can be as large as 100×. By enhancing the intra-cavity power, the factor ($I_s/I_p$) in Equation 3 can be made very large, allowing Signal Emission to dominate over Pump ESA and mitigate its detrimental impact on lasing via Tb-doped fibers.

It should be noted that the absolute intra-cavity power will be related to the pump power by the optical-to-optical conversion efficiency η, which is related to the output coupler reflectivity R. Nonetheless, FIG. 8 points towards the direction to eliminating ESA in Tb:fibers.

In its current form, the model allows for propagation in Tb:fiber including pumping, signal gain extraction, ESA, and non-radiative losses in a fiber amplifier configuration. Although this model is not strictly a model for a laser (oscillator) configuration, a first-order estimate of the effectiveness of intra-cavity power enhancement to defeat ESA can be obtained by launching a variable seed power into the amplifier and calculating the subsequent conversion of pump power into signal power. In other words, if high pump-to-signal conversion efficiency can be obtained, then ESA is no longer dominating the upper-level population statistics.

FIG. 17 shows the calculated pump-to-signal power conversion efficiency as a function of the effective intra-cavity power (represented by the seed power) normalized to the pump power injected into the amplifier. It is clear from this graph that resonant intra-cavity power enhancement can, in fact, suppress pump ESA to allow high efficiency (~50%) laser operation. Moreover, using a value of $P_{intracavity}/P_{pump}=2$ and the associated 46% conversion efficiency means a modest intra-cavity power enhancement factor of ~43. From FIG. 16, this dictates an OC reflectivity of 70%, which will allow significant feedback into the resonator cavity without significant detriment to the laser efficiency.

This is strikingly different from typical high-efficiency fiber lasers, which usually use a low reflector (3-10%) on the output coupler in order to maximize power output. The data point in FIG. 17 (symbolized by a diamond-shaped point) is the world-record experimental measurement [T. Yamashita, G. Qin, T. Suzuki, and Y. Ohishi, "A New Green Fiber Laser Using Terbium-Doped Fluoride Fiber," in OFC/NFOEC 2008, paper JWA18]. In spite of the "typical" high-efficiency configuration of low OC reflectivity (10%) used in the experiment of this reference, the extracted power was extremely low (<1%) due to ESA effects. FIG. 17 indicates that mitigation of ESA for high-power visible Tb:fiber lasers can be achieved by using the resonant intra-cavity power enhancement techniques disclosed herein.

Figure 18:
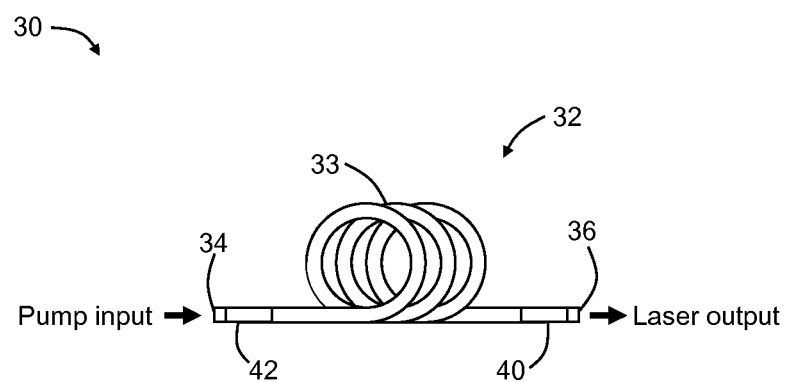
FIG. 18 illustrates a simplified fiber laser resonator schematic according to another embodiment of the present disclosure.
Figure 19:
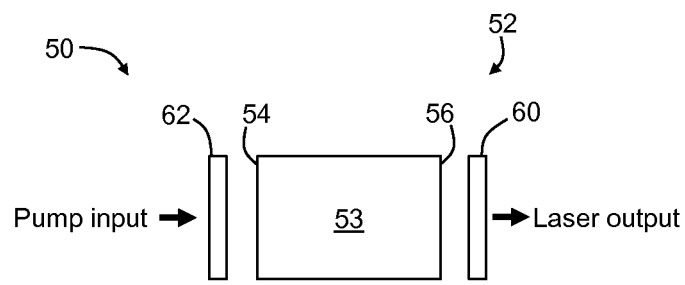
FIG. 19 illustrates a simplified discrete laser resonator schematic according to another embodiment of the present disclosure.

In an embodiment of the present disclosure, a laser comprises a non-traditional optical cavity to resonantly enhance the laser emission (signal) power recirculating within the cavity. Since the pump light is non-resonant, the ratio $I_s/I_p$ can be made arbitrarily large. FIGS. 18 and 19 are schematics of exemplary embodiments of this concept for a fiber laser (FIG. 18) and a discrete (e.g., solid-state) laser (FIG. 19).

FIG. 18 depicts a fiber laser 30 having an optical cavity 32 and a gain medium disposed within the optical cavity 32. For example, the gain medium can be a core of a double-clad optical fiber 33. The optical cavity 32 has an input end 34 and an output end 36. The gain medium has a signal frequency (sometimes referred to herein as the lasing frequency) which is the frequency at which the gain medium provides a desired laser emission. The gain medium can be, for example, a lambda-type material. For example, the optical fiber 33 may comprise a Tb-doped gain medium. In another example, the optical fiber 33 comprises a Tb-doped gain medium that is co-doped with ytterbium. An input element 42 is disposed at the input end 34 of the optical cavity 32. The input element 42 is configured to be highly reflective at the signal frequency. For example, embodiments of the input element 42 may reflect greater than 90-100% of light at the signal frequency. The input element 42 may be, for example, a fiber Bragg grating reflector. The input element 42 may be configured to couple the optical cavity 32 to a pump laser. An output coupler 40 is disposed at the output end 36 of the cavity 32. The output coupler 40 is configured to have a reflectivity at the signal frequency which is sufficient to suppress the ESA. In embodiments the output coupler 40 is configured to reflect more than 30%, 40%, 50%, 60%, 70%, 80%, or higher amounts of the signal. The design reflectivity values can be selected based on the requirements in view of, for example, FIGS. 16 and 17 or similar criteria. The output coupler 40 may be, for example, a fiber Bragg grating reflector.

FIG. 19 depicts an embodiment of the present disclosure wherein a laser 50 comprises an optical cavity 52 with an input end 54 and an output end 56. A gain medium 53, such as, for example, a lambda-type material, is disposed within the optical cavity 52. For example, the optical cavity may comprise a gain medium 52 which is a solid state material. An input element 62 disposed at the input end 64 of the optical cavity 52. The input element 62 may be, for example, a dichroic element. Such a dichroic input element 62 may be configured to be highly reflective at the signal frequency and anti-reflective at the pump frequency. An output coupler 60 is disposed at the output end 56 of the cavity 52. As discussed above, the output coupler 60 is configured to have a reflectivity at the signal frequency, which is sufficient to suppress the ESA. In embodiments the output coupler 60 is configured to reflect more than 30%, 40%, 50%, 60%, 70%, 80%, or higher amounts of the signal. The design reflectivity values can be selected based on the requirements in view of, for example, FIGS. 19 and 20 or similar criteria.

For the resonator configuration shown in FIGS. 18 and 19, the enhancement of the intra-cavity power is determined at least in part by the reflectivity of the output coupler 40, 60.

This intra-cavity power enhancement factor, plotted in FIG. 16 as a function of output coupler reflectivity R, can be as large as 100×. By enhancing the intracavity power, the factor $(I_s/I_p)$ in Equation 3 can be made very large, allowing Signal Emission to dominate over Pump ESA and mitigate its detrimental impact.

Figure 1:
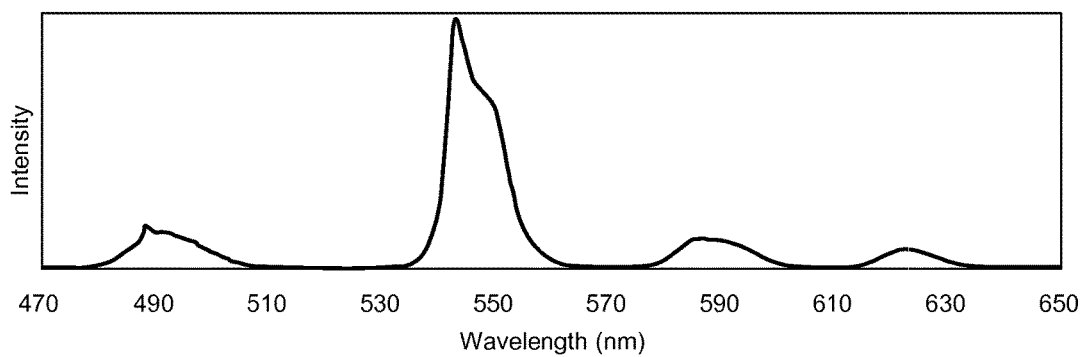
FIG. 1 illustrates measured photoluminescence spectra of 56 wt % Tb-doped fiber pumped with a 405 nm laser.
Figure 2:
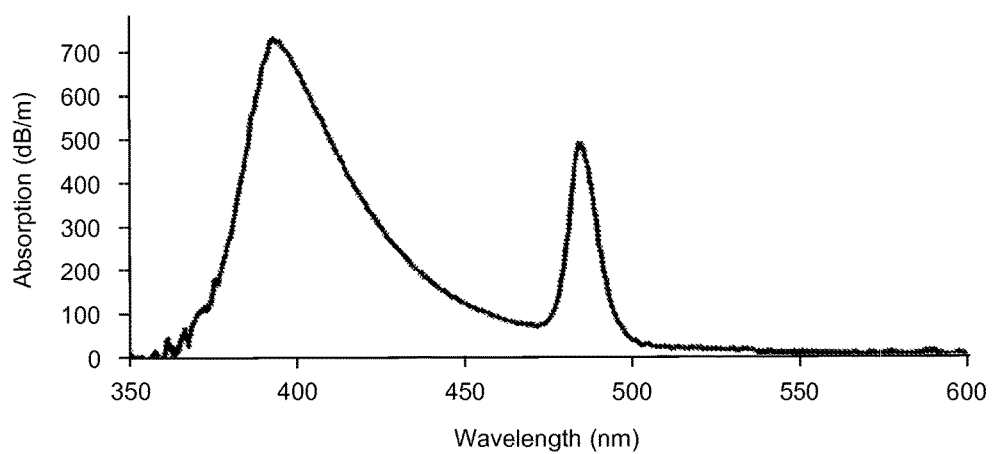
FIG. 2 plots measured absolute absorption spectra of 56 wt % Tb-doped fiber.
Figure 3:
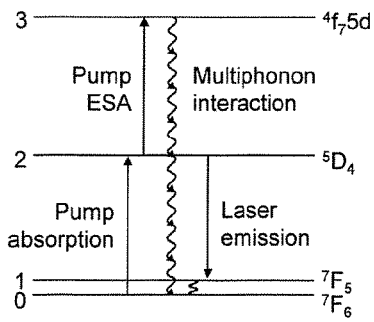
FIG. 3 illustrates a simplified energy-level diagram for $Tb^{3+}$ wherein solid lines indicated optical interactions and wavy lines indicated phonon interactions.
Figure 4:
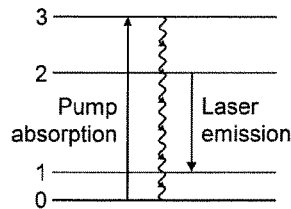
FIG. 4 illustrates a simplified energy-level diagram for a conventional four-level laser system wherein solid lines indicated optical interactions and wavy lines indicated phonon interactions.

Besides providing more efficient lasing in lambda-type laser materials using a resonant optical cavity to suppress ESA, embodiments of the present disclosure may be applicable to conventional 4- and 3-level laser materials whose excited pump state is susceptible to ESA. In conventional 4- and 3-level laser systems that do not suffer from ESA, the pump excites the electron to the excited pump state, where it rapidly relaxes down to the upper lasing state, as depicted in FIGS. 3-5. Rapid relaxation of the electron population from the excited pump state to the upper lasing state has been one of the criterion used for selecting appropriate 4- and 3-level laser materials.

Figure 6:
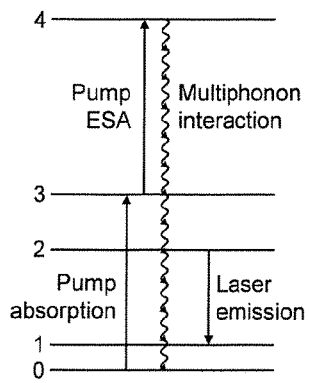
FIG. 6 illustrates simplified energy-level diagrams for 4-level laser materials wherein solid lines indicate optical interactions and wavy lines indicate phonon interactions.
Figure 7:
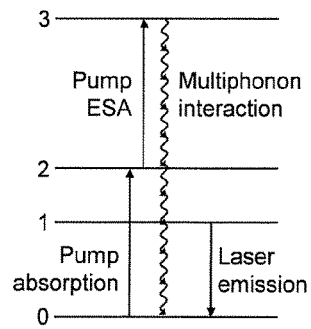
FIG. 7 illustrates simplified energy-level diagrams for 3-level laser materials wherein solid lines indicate optical interactions and wavy lines indicate phonon interactions.

In lambda materials, the long lifetime of the excited pump state nominally allows the excited electron to be susceptible to excited-state absorption (ESA). Through the process of ESA, the electron in the excited pump level absorbs yet another pump photon and is excited to an even higher energy level (which is often within a nearly continuous band of high-energy levels). This higher energy level is almost always unstable due to the proximity of neighboring energy levels, and the electron energy is lost as the electron decays back down to the excited pump level or even lower. This physical process is captured in FIGS. 6-8 for 4-level, 3-level, and inverted 3-level systems. The result of this process is that at least one pump photon (and possibly two) that was absorbed is lost, resulting in reduced net gain and a nominally unsuitable lasing material. This problem is borderline in erbium ions, a nominally 3-level laser material for which the lifetime of the excited pump state is not ideally short, and limits the efficiency of common telecommunications erbium-doped fiber amplifiers (EDFAs).

In some embodiments, the solution to the problem of ESA lies in resonant de-excitation or de-population of the upper pump state. In the case of conventional 4- and 3-level materials, a new optical emission is induced to intentionally extract electron energy from the excited pump state to the upper lasing state faster than ESA can occur. In the inverted 3-level (lambda) laser material, the lasing signal itself is enhanced (strengthened) to de-populate the excited pump state (for lambda materials, a.k.a. upper lasing state) before ESA can occur. These physical processes are captured in FIG. 6-8. Although the processes appear to be different for the conventional vs. inverted cases, both processes utilize optically induced de-population (de-excitation) of the excited pump state to suppress detrimental ESA.

Figure 9:
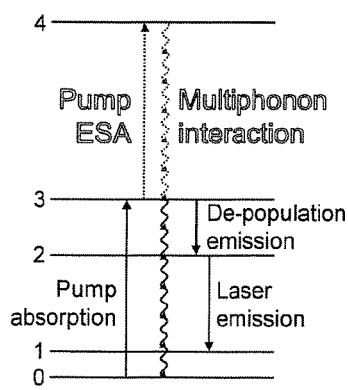
FIG. 9 illustrates simplified energy-level diagrams for 4-level laser materials using resonant de-population of the excited pump state, wherein solid lines indicate optical interactions and wavy lines indicate phonon interactions.
Figure 10:
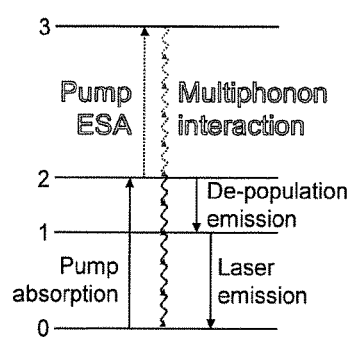
FIG. 10 illustrates simplified energy-level diagrams for 3-level laser materials using resonant de-population of the excited pump state, wherein solid lines indicate optical interactions and wavy lines indicate phonon interactions.
Figure 11:
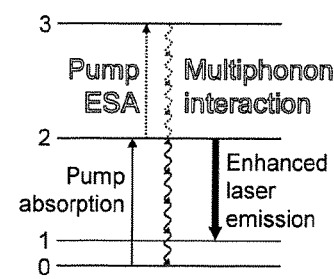
FIG. 11 illustrates simplified energy-level diagrams for inverted 3-level (lambda) laser materials using resonant de-population of the excited pump state, wherein solid lines indicate optical interactions and wavy lines indicate phonon interactions.

For implementation in conventional 4- and 3-level lasing materials (FIGS. 9-11), the ratio of de-population emission rate to the ESA rate is governed by the Equation 4:

$$\frac{\text{Depopulation Emmission}}{\text{Pump } ESA} = \frac{\sigma_d^e I_d}{h\nu_d} N_{ep} \bigg/ \frac{\sigma_p^{ESA} I_p}{h\nu_p} N_{ep} = \frac{\sigma_d^e \nu_p}{\sigma_p^{ESA} \nu_d}\left(\frac{I_s}{I_p}\right) \quad (4)$$

In Equation 4, $N_{ep}$ is the population of the excited pump state (e.g., $N_3$ for the 4-level material, and $N_2$ for the 3-level material), $\Sigma$ is the cross section of emission (e) and ESA, I is the optical intensity, v is the optical frequency, h is Planck's constant, and the subscripts p and d refer to the pump and de-population signal, respectively. The right-hand side of Equation 4 reveals that if the depopulation intensity can be made much larger than the pump intensity, then ESA can be effectively suppressed. Moreover, $v_p$ will be larger than $v_d$ (often much larger) implying that a very strong intensity $I_d$ may not be required.

Figure 20:
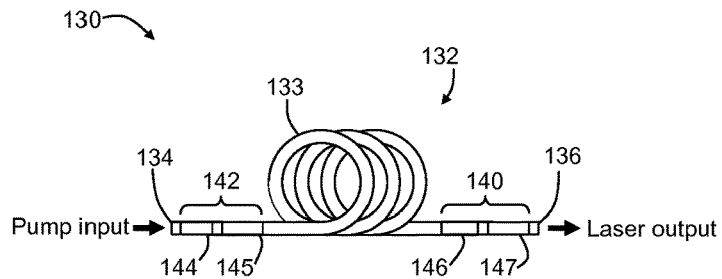
FIG. 20 illustrates a simplified fiber laser resonator schematic according to another embodiment of the present disclosure.
Figure 21:
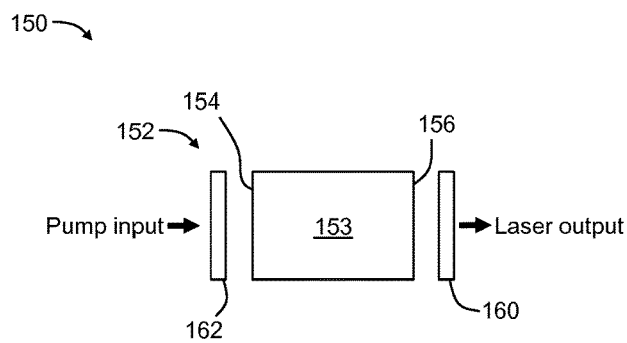
FIG. 21 illustrates a simplified discrete laser resonator according to another embodiment of the present disclosure.

An effective way to generate $I_d$ and make the ratio of intensities favorable to suppress ESA is to allow the de-population emission at $v_d$ to lase using a resonant optical cavity. Since the pump light is non-resonant and the de-population emission can be made to lase using nearly 100% reflectors, the ratio $I_d/I_p$ can be made arbitrarily large using this method (see FIG. 16). FIGS. 20 and 21 are schematic depictions of exemplary embodiments of this concept for a fiber laser (FIG. 20) and a discrete (e.g., solid-state) laser (FIG. 21).

FIG. 20 depicts a fiber laser 130 having an optical cavity 132 and a gain medium disposed within the optical cavity 132. For example, the gain medium may be a core of a double-clad optical fiber 133. The optical cavity 132 has an input end 134 and an output end 136. The gain medium has a signal frequency, which is the optical frequency at which the gain medium provides a desired laser emission. The gain medium also has a de-population frequency, which is the optical frequency of emission when de-populating the higher energy state caused by ESA. The gain medium can be, for example, a lambda-type material. For example, the optical cavity 132 may comprise a doped fiber, such as a Tb-doped fiber. An input element 142 is disposed at the input end 134 of the cavity 132. The input element 142 is configured to be highly reflective at the signal frequency. The input element 142 is further configured to be highly reflective at the de-population frequency. In some embodiments, the input element 142 comprises a first element 144, such as a fiber Bragg grating (FBG), configured to be highly reflective at the signal frequency, and a second element 145, such as an FBG, configured to be highly reflective at a de-population frequency. By highly reflective, embodiments of the input element 142 may reflect greater than 90-100% of the impinging light. The input element 142 may be configured to couple the optical cavity 132 to a pump laser.

An output coupler 140 is disposed at the output end 136 of the optical cavity 132. The output coupler 140 is configured to be highly reflective at the de-population frequency. The output coupler 140 may be, for example, an FBG. In some embodiments, the output coupler 140 comprises a first output element 146, such as an FBG, configured to be highly reflective at the de-population signal frequency, and a second output element 147, such as an FBG, configured to couple the signal output.

FIG. 21 depicts an embodiment of the present disclosure wherein a laser 150 comprises an optical cavity 152 and a gain medium 153 disposed within the optical cavity 152. The optical cavity 152 has an input end 154 and an output end 156. The gain medium 153 has a signal frequency, which is the optical frequency at which the gain medium 153 provides a desired laser emission. The gain medium 153 also has a de-population frequency, which is the optical frequency of emission when de-populating the higher energy state caused by ESA. The gain medium 153 can be, for example, a lambda-type material. For example, the optical cavity 152 may comprise a solid state material doped with Tb. An input element 162 disposed at the input end 164 of the cavity 152 may be, for example, a trichroic element. Such a trichroic input element 162 may be configured to be highly reflective at the signal frequency, highly reflective at the de-population frequency, and anti-reflective at a pump frequency (e.g., the frequency of a pump laser). An output coupler 160, disposed at the output end 156 of the cavity 152, is configured to be highly reflective at the de-population frequency, and couple the signal. In this way, the optical cavity 152 acts as a resonant optical cavity at the de-population frequency, and the pump light is non-resonant.

Figure 22:
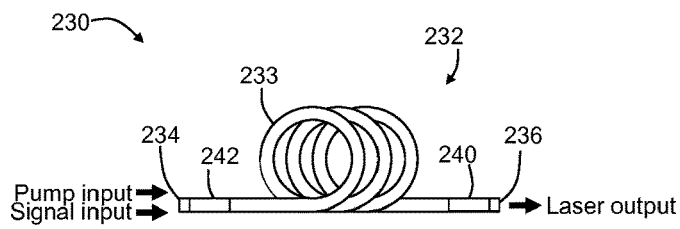
FIG. 22 illustrates a simplified fiber amplifier schematic according to another embodiment of the present disclosure.
Figure 23:
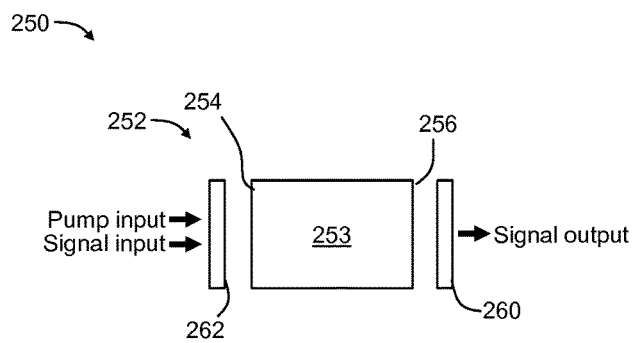
FIG. 23 illustrates a simplified discrete amplifier according to another embodiment of the present disclosure.

This de-population concept not only allows for high efficiency signal lasing, but also for high efficiency signal amplification. FIGS. 22 and 23 are schematic depictions of exemplary embodiments of this concept for a fiber amplifier (FIG. 22) and a discrete (e.g., solid-state) amplifier (FIG. 23).

FIG. 22 depicts a fiber laser 230 having an optical cavity 232 and a gain medium disposed within the optical cavity 232. For example, the gain medium may be a core of a double-clad optical fiber 133. The optical cavity 232 has an input end 234 and an output end 236. The gain medium has a signal frequency, which is the optical frequency at which the gain medium provides a desired laser emission. The gain medium also has a de-population frequency, which is the optical frequency of emission when de-populating the higher energy state caused by ESA. The gain medium can be, for example, a lambda-type material. For example, the optical cavity 232 may comprise a doped fiber, such as a Tb-doped fiber. An input element 242 is disposed at the input end 234 of the cavity 232. The input element 242 is configured to be highly reflective at the de-population frequency. In some embodiments, the input element 242 comprises an FBG configured to be highly reflective at the de-population frequency. By highly reflective, embodiments of the input element 242 may reflect greater than 90-100% of the impinging light at the de-population frequency. The input element 242 may be configured to couple the optical cavity 232 to a pump laser and further configured to couple the optical cavity 232 to a signal source. In the present embodiment, the laser 230 is configured as an amplifier, and the laser 230 is configured to receive a signal input, as well as the pump input, at the input end 234.

An output coupler 240 is disposed at the output end 236 of the cavity 232. The output coupler 240 is configured to be highly reflective at the de-population frequency. The output coupler 260 may be, for example, a dichroic element. Such a dichroic output coupler 260 is configured to be highly-reflective at the de-population frequency and to couple the signal. The output coupler 240 may be, for example, an FBG.

FIG. 23 depicts an embodiment of the present disclosure wherein a laser 250 comprises an optical cavity 252 and a gain medium 253 disposed within the optical cavity 252. The optical cavity 252 has an input end 254 and an output end 256. The gain medium 253 has a signal frequency, which is the optical frequency at which the gain medium 253 provides a desired laser emission. The gain medium 253 also has a de-population frequency, which is the optical frequency of emission when de-populating the higher energy state caused by ESA. The gain medium 253 can be, for example, a lambda-type material. For example, the optical cavity 252 may comprise a solid state material doped with Tb. An input element 262 disposed at the input end 264 of the cavity 252 may be, for example, a trichroic element. Such a trichroic input element 262 may be configured to be anti-reflective at the signal frequency, highly reflective at the de-population frequency, and anti-reflective at a pump frequency (e.g., the frequency of a pump laser). In the present embodiment, the laser 250 is configured as an amplifier, and the input element 262 is anti-reflective at the signal frequency such that the laser 250 can receive a signal input, as well as the pump input, at the input end 254.

An output coupler 260, disposed at the output end 256 of the cavity 252, is configured to be highly reflective at the de-population frequency, and is anti-reflective at the signal frequency. The output coupler 260 may be, for example, a dichroic element. Such a dichroic output coupler 260 is configured to be highly-reflective at the de-population frequency and anti-reflective at the signal frequency. In this way, the optical cavity 252 acts as a resonant optical cavity at the de-population frequency.

In all four cases shown in FIGS. 20-23, the de-population signal is resonant within the high-finesse cavity with almost no emission outside the cavity. However, the de-population resonator does not have to be 100% reflecting on both sides. Rather, the de-population resonator may only be sufficiently strong to allow ESA to be effectively suppressed.

Instead of making a resonant cavity for the de-population signal, it is also possible to inject an optical source $I_d$ into the fiber or solid-state laser medium provided the rate ratio in Equation 4 is still favorable. Although this method is likely to be more expensive (at least in the case of a fiber laser medium), it may be more controllable in terms of de-population emission wavelength.

It should be noted that "highly reflective" is used throughout to indicate that substantially all of the impinging light is reflected (at the specified frequencies). For example, in embodiments of the disclosure, a highly reflective component may reflectivity of greater than 90%, 95%, 98%, or 100% of the impinging light at the specified frequency.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A laser, comprising:
   an optical cavity;
   a gain medium disposed within the optical cavity; and
   wherein the optical cavity is configured such that, when the gain medium is excited by pump light from a pump source, an intensity of a de-population signal within the gain medium is larger than an intensity of the pump light within the gain medium.

2. The laser of claim 1, further comprising:
   an input element at an input end of the optical cavity, the input element configured to reflect at least 90% of impinging light at a de-population frequency of the gain medium; and
   an output coupler at an output end of the optical cavity, the output coupler configured to reflect at least 90% of impinging light at the de-population frequency of the gain medium.

3. The laser of claim 1, wherein the gain medium comprises a material having a rare earth dopant.

4. The laser of claim 3, wherein the rare earth dopant is terbium.

5. The laser of claim 4, wherein the terbium-doped gain medium is co-doped with ytterbium.

6. The laser of claim 1, wherein the optical cavity comprises a dual-clad optical fiber having a rare earth dopant in the core.

7. The laser of claim 2, wherein the optical cavity comprises an optical fiber having a rare earth dopant.

8. The laser of claim 7, wherein the input element is a fiber Bragg grating reflector and the output coupler is a fiber Bragg grating reflector.

9. The laser of claim 8, further comprising a second input element which is a fiber Bragg grating reflector configured to be highly reflective at a signal frequency of the gain medium.

10. The laser of claim 1, wherein the gain medium comprises a material susceptible to excited-state absorption.

11. The laser of claim 2, wherein the input element is further configured to be highly reflective at a signal frequency of the gain medium.

12. The laser of claim 2, wherein the output coupler is a dichroic component.

13. The laser of claim 11, further comprising a signal output coupler at the output end of the optical cavity, the signal output coupler being a fiber Bragg grating reflector.

14. A laser system, comprising:
    an optical cavity having an input end and an output end;
    a gain medium disposed within the optical cavity, the gain medium having a signal frequency and a de-population frequency;
    a pump laser configured to provide an output beam at an excitation frequency;
    a de-population laser configured to provide an output beam at the de-population frequency; and
    an input coupler configured to couple the pump laser and the de-population laser to the input end of the optical cavity such that the output beams are directed into the optical cavity.

15. A laser, comprising:
    an optical cavity having an input end and an output end;
    a gain medium disposed within the optical cavity, the gain medium having a signal frequency;
    an input element at the input end of the optical cavity, the input element having reflectivity of at least 90% at the signal frequency; and
    an optical coupler at an output end of the optical cavity, the optical coupler having a reflectivity at the signal frequency, which is sufficient to suppress excited-state absorption in the gain medium.

16. The laser of claim 15, wherein the optical coupler has a reflectivity of at least 50% at the signal frequency.

17. The laser of claim 15, wherein the optical coupler has a reflectivity of at least 70% at the signal frequency.

18. The laser of claim 15, wherein the optical cavity comprises an optical fiber having a rare earth dopant.

19. The laser of claim 18, wherein the input element is a fiber Bragg grating reflector and the output coupler is a fiber Bragg grating reflector.

20. The laser of claim 15, wherein the output coupler is a dichroic component.

* * * * *